US012707543B2

(12) United States Patent
Peng

(10) Patent No.: US 12,707,543 B2
(45) Date of Patent: Aug. 11, 2026

(54) LED APPARATUS AND LIGHT-EMITTING DIODE STRING WITH STABLE VOLTAGE CONTROL

(71) Applicant: SEMISILICON TECHNOLOGY CORP., New Taipei City (TW)

(72) Inventor: Wen-Chi Peng, New Taipei City (TW)

(73) Assignee: SEMISILICON TECHNOLOGY CORP., New Taipei City (TW)

( * ) Notice: Subject to any disclaimer, the term of this patent is extended or adjusted under 35 U.S.C. 154(b) by 101 days.

(21) Appl. No.: 18/531,995

(22) Filed: Dec. 7, 2023

(65) Prior Publication Data

US 2025/0048515 A1 Feb. 6, 2025

(30) Foreign Application Priority Data

Jul. 31, 2023 (TW) ................................ 112128691
Oct. 13, 2023 (TW) ................................ 112139159

(51) Int. Cl.
*H05B 45/34* (2020.01)
*H05B 45/10* (2020.01)

(52) U.S. Cl.
CPC ............. *H05B 45/34* (2020.01); *H05B 45/10* (2020.01)

(58) Field of Classification Search
CPC ......... G09G 3/3233; G09G 2300/0819; G09G 2300/0861; G09G 2300/0842; G09G 3/3266; G09G 2300/0426; G09G 2340/0435; G09G 2310/08; G09G 2310/0262; G09G 2330/021
See application file for complete search history.

(56) References Cited

U.S. PATENT DOCUMENTS 7,750,873 B2 * 7/2010 Kim .................... G09G 3/3233 345/82
2010/0220039 A1 * 9/2010 Park ................... H02M 3/1588 315/176

(Continued)

FOREIGN PATENT DOCUMENTS

| | | |
|---|---|---|
| CN | 115278976 A | 11/2022 |
| TW | 202142050 A | 11/2021 |

OTHER PUBLICATIONS

Office Action dated Nov. 5, 2024 of the corresponding Taiwan patent application No. 112139159.

*Primary Examiner* — Wei (Victor) Y Chan
(74) *Attorney, Agent, or Firm* — MUNCY, GEISSLER, OLDS & LOWE, P.C.

(57) ABSTRACT

A LED string with stable voltage control receives a DC voltage. The LED string includes a plurality of LED apparatuses and a controller. The plurality of LED apparatuses sequentially receives a plurality of data signals externally provided by the controller through a signal path. The controller preferentially supplies power to the LED apparatus that directly receives the DC voltage via the positive voltage end, and the remaining LED apparatuses are supplied power sequentially. When the plurality of LED apparatuses does not receive the plurality of data signals, a bypass path is enabled to bypass the signal path so that no current flowing through the signal path; otherwise, when the plurality of LED apparatuses receives the plurality of data signals, the bypass path is disabled to make the plurality of data signals be transmitted through the signal path.

13 Claims, 9 Drawing Sheets

(56) References Cited

U.S. PATENT DOCUMENTS

| | | | | |
|---|---|---|---|---|
| 2012/0200229 | A1* | 8/2012 | Kunst | H05B 45/385 315/186 |
| 2013/0120228 | A1* | 5/2013 | Yoon | G09G 3/3233 345/80 |
| 2013/0162620 | A1* | 6/2013 | Kim | G09G 3/3233 345/212 |
| 2015/0049126 | A1* | 2/2015 | Jung | G09G 3/3233 315/172 |
| 2019/0377401 | A1* | 12/2019 | Maeda | G11C 11/40 |
| 2021/0327366 | A1* | 10/2021 | Maeda | G09G 3/3291 |
| 2022/0180819 | A1* | 6/2022 | Ono | G09G 3/3233 |
| 2023/0186862 | A1* | 6/2023 | Choi | G09G 3/3266 |
| 2023/0282163 | A1* | 9/2023 | Hamer | G09G 3/3233 345/212 |
| 2025/0140167 | A1* | 5/2025 | Yang | G09G 3/32 |
| 2025/0157416 | A1* | 5/2025 | Kim | G09G 3/3275 |

* cited by examiner

LED APPARATUS AND LIGHT-EMITTING DIODE STRING WITH STABLE VOLTAGE CONTROL

BACKGROUND

Technical Field

The present disclosure relates to a light-emitting diode (LED) apparatus and a LED string, and more particularly to a LED apparatus and a LED string with stable voltage control.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

At present, the application of LEDs is becoming more and more popular, and its manufacturing cost is getting lower and lower, and therefore the application of LEDs in lighting or display is becoming more and more extensive. Correspondingly, there are more and more ways to operate and control the light-emitting behavior of LEDs. The brightness of the LED is determined by the current flowing through the LED, and therefore when the current flowing through the LED is larger, the brightness of the LED is higher, and vice versa.

On the other hand, it can be known from Ohm's law that the magnitude of the current is determined by the operating voltage received by the LED string. When the working voltage is higher, the current flowing through the LED string will be larger, and vice versa. However, there will usually be multiple LED apparatuses in a LED string, and since the LED string usually has line loss on the path of transmitting the working voltage, the working voltage received by each LED apparatus will be inconsistent due to the line loss, thereby making the brightness of each LED inconsistent.

Therefore, how to design a LED apparatus and a LED string with stable voltage control to solve the problems and technical bottlenecks of inconsistent brightness of each LED due to the different operating voltages received by the LED apparatus has become a critical topic in this field.

SUMMARY

An objective of the present disclosure is to provide a LED apparatus with stable voltage control to solve the existing problems.

In order to achieve the objective, the LED apparatus with stable voltage control includes a positive voltage end, a negative voltage end, a data input end, and a data output end, wherein the LED apparatus is coupled to a LED. The LED apparatus externally receives a data signal through a signal path, and the LED apparatus is supplied power to drive by a drive voltage. When the LED apparatus does not receive the data signal, a bypass path is enabled to bypass the signal path so that no current flowing through the signal path. When the LED apparatus receives the data signal, the bypass path is disabled to make the data signal be transmitted through the signal path so that the LED apparatus is stably supplied power by the drive voltage.

In one embodiment, the LED apparatus further includes a first bypass circuit. The first bypass circuit includes a first switch and a second switch, and an inverting unit. The first switch and the second switch are coupled to the drive voltage, wherein the second switch provides the bypass path. The inverting unit is coupled to the first switch and the second switch, wherein the first switch and the second switch are turned on and turned off in complementary by operating the inverting unit.

In one embodiment, the first bypass circuit is arranged at the data output end of the LED apparatus.

In one embodiment, the first bypass circuit is arranged at the data input end of the LED apparatus.

In one embodiment, when the LED apparatus does not receive the data signal, the first switch is turned off and the second switch is turned on so that the bypass path is enabled; when the LED apparatus receives the data signal, the first switch is turned on and the second switch is turned off so that the bypass path is disabled to make data signal be transmitted through the signal path provided by the first switch.

In one embodiment, the LED apparatus further includes a second bypass circuit. The second bypass circuit includes a first switch and a second switch, and inverting unit. The first switch and the second switch are coupled to the drive voltage, wherein the first switch is coupled to the LED in series. The inverting unit are coupled to the first switch and the second switch, wherein the first switch and the second switch are turned on and turned off in complementary by operating the inverting unit.

In one embodiment, the second bypass circuit further includes an impedance matching component. The impedance matching component is coupled to the first switch and the LED in series, wherein the impedance matching component provides an impedance characteristic corresponding to the LED.

Another objective of the present disclosure is to provide a LED string with stable voltage control to solve the existing problems.

In order to achieve the objective, the LED string with stable voltage control receives a DC voltage. The LED string includes a plurality of LED apparatuses and a controller. Each LED apparatus includes a positive voltage end, a negative voltage end, a data input end, and a data output end, wherein each LED apparatus is coupled to a LED. The controller includes a positive polarity end, a negative polarity end, and a data end. The positive polarity end is coupled to the DC voltage and the negative polarity end is coupled to a ground end. The plurality of LED apparatuses sequentially receive a plurality of data signals externally provided by the controller through a signal path, and the controller preferentially supplies power to the LED apparatus that directly receives the DC voltage via the positive voltage end, and the remaining LED apparatuses are supplied power sequentially so that the plurality of LED apparatuses are sequentially supplied power to drive by a drive voltage. When the plurality of LED apparatuses does not receive the plurality of data signals, a bypass path is enabled to bypass the signal path so that no current flowing through the signal path. When the plurality of LED apparatuses receives the plurality of data signals, the bypass path is disabled to make the plurality of data signals be transmitted through the signal path so that the plurality of LED apparatuses is stably supplied power by the drive voltage.

In one embodiment, the plurality of LED apparatuses forms a series-connected structure or a parallel-series-connected structure. The negative voltage end of the first LED apparatus is coupled to the negative polarity end of the controller, and the positive voltage end of the last LED apparatus is coupled to the DC voltage.

In one embodiment, the series-connected structure is a one-by-n array structure. The sequence that the controller provides the plurality of data signals is the first LED apparatus, the second LED apparatus, until the last LED apparatus. The sequence that the controller controls the power supply of the DC voltage is the last LED apparatus, the second to last LED apparatus, until the first LED apparatus.

In one embodiment, the parallel-series-connected structure is a m-by-n matrix structure. The sequence that the controller provides the plurality of data signals is the first LED apparatus, the second LED apparatus, until the last LED apparatus. The sequence that the controller controls the power supply of the DC voltage is n LED apparatuses in the last row, n LED apparatuses in the second to last row, until the n LED apparatuses in the first row.

In one embodiment, the plurality of LED apparatuses forms a series-connected structure or a parallel-series-connected structure. The positive voltage end of the first LED apparatus is coupled to the DC voltage, and the negative voltage end of the last LED apparatus is coupled to the negative polarity end.

In one embodiment, the series-connected structure is a one-by-n array structure. The sequence that the controller provides the plurality of data signals is the first LED apparatus, the second LED apparatus, until the last LED apparatus. The sequence that the controller controls the power supply of the DC voltage is the first LED apparatus, the second LED apparatus, until the last LED apparatus.

In one embodiment, the parallel-series-connected structure is a m-by-n matrix structure. The sequence that the controller provides the plurality of data signals is the first LED apparatus, the second LED apparatus, until the last LED apparatus. The sequence that the controller controls the power supply of the DC voltage is n LED apparatuses in the first row, n LED apparatuses in the second row, until the n LED apparatuses in the last row.

In one embodiment, each LED apparatus further includes a first bypass circuit. The first bypass circuit includes a first switch, a second switch, and an inverting unit. The first switch and the second switch are coupled to the drive voltage. The second switch provides the bypass path. The inverting unit is coupled to the first switch and the second switch, wherein the first switch and the second switch are turned on and turned off in complementary by operating the inverting unit.

In one embodiment, the first bypass circuit is arranged at the data output end of each of the LED apparatuses.

In one embodiment, the first bypass circuit is arranged at the data input end of each of the LED apparatuses.

In one embodiment, when the plurality of LED apparatuses does not receive the plurality of data signals, the first switch is turned off and the second switch is turned on so that the bypass path is enabled. When the plurality of LED apparatuses receives the plurality of data signals, the first switch is turned on and the second switch is turned off so that the plurality of data signals is transmitted through the signal path provided by the first switch.

In one embodiment, each LED apparatus further includes a second bypass circuit. The second bypass circuit includes a first switch and a second switch, and an inverting unit. The first switch and the second switch are coupled to the drive voltage, wherein the first switch is coupled to the LED in series. The inverting unit is coupled to the first switch and the second switch, wherein the first switch and the second switch are turned on and turned off in complementary by operating the inverting unit.

In one embodiment, the second bypass circuit further includes an impedance matching component. The impedance matching component is coupled to the first switch and the LED in series, wherein the impedance matching component is configured to provide an impedance characteristic corresponding to the LED.

Therefore, the LED apparatus and LED string with stable voltage control provide the first bypass circuit and the second bypass circuit to realize the stable voltage control of the LED apparatus and the LED string for both the data signal transmission operation and the light-emitting operation.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
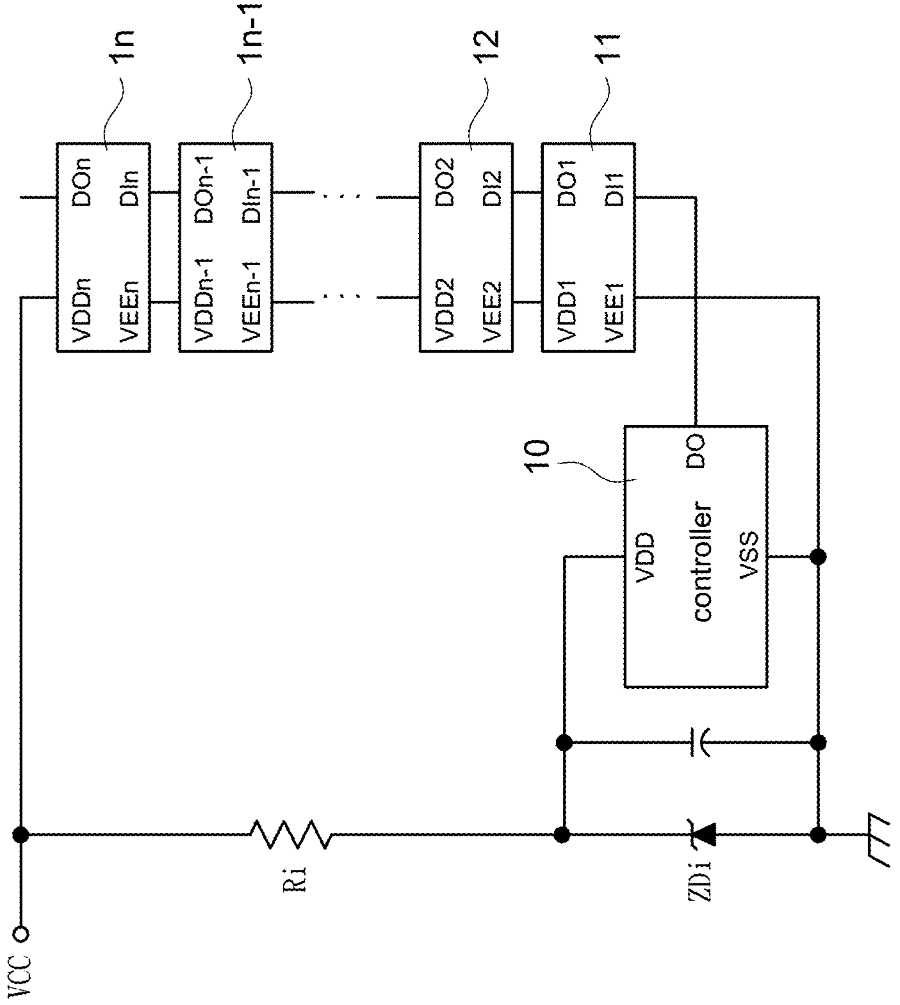
FIG. 1 is a block circuit diagram of a LED string with stable voltage control according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a LED string with stable voltage control according to a first embodiment of the present disclosure. The LED (light-emitting diode) string with stable voltage control (hereinafter abbreviated as "LED string") receives a DC (direct current) voltage VCC, and the LED string includes a plurality of LED apparatuses 11-1*n* and a controller 10. Each LED apparatus 11-1*n* has a positive voltage end VDD1-VDDn, a negative voltage end VEE1-VEEn, a data input end DI1-Din, and a data output end DO1-DOn. As shown in FIG. 1, each LED apparatus 11-1*n* is a four-pin LED lamp.

The controller 10 includes a positive polarity end VDD, a negative polarity end VSS, and a data end DO. The positive polarity end VDD is coupled to the DC voltage VCC and receives the DC voltage VCC, and the negative polarity end VSS is grounded.

In the embodiment shown in FIG. 1, the LED apparatuses 11-1*n* form a series-connected structure. In such structure, a negative voltage end VEE1 of the first LED apparatus 11 is coupled to the negative polarity end VSS of the controller 10, a positive voltage end VDDn of the last LED apparatus 1*n* is coupled to the DC voltage VCC and receives the DC voltage VCC, and the remaining power pins (such as positive voltage ends VDD and negative voltage ends VEE) are connected in series. Moreover, data signal pins (such as data input ends DI and data output ends DO) are connected in series.

Specifically, the series-connected structure is a one-by-n (1×n) array structure, that is, the power pins are connected in series and the data signal pins are connected in series. The sequence that the controller 10 provides the plurality of data signals is the first LED apparatus 11, the second LED apparatus 12, until the last LED apparatus 1*n*. Moreover, the sequence that the controller 10 controls the power supply of the DC voltage VCC is the last LED apparatus 1*n*, the second to last LED apparatus 1*n*-1, until the first LED apparatus 11. Therefore, in the embodiment shown in FIG. 1, the sequence of supplying power is opposite to the sequence of providing data signals.

Figure 2:
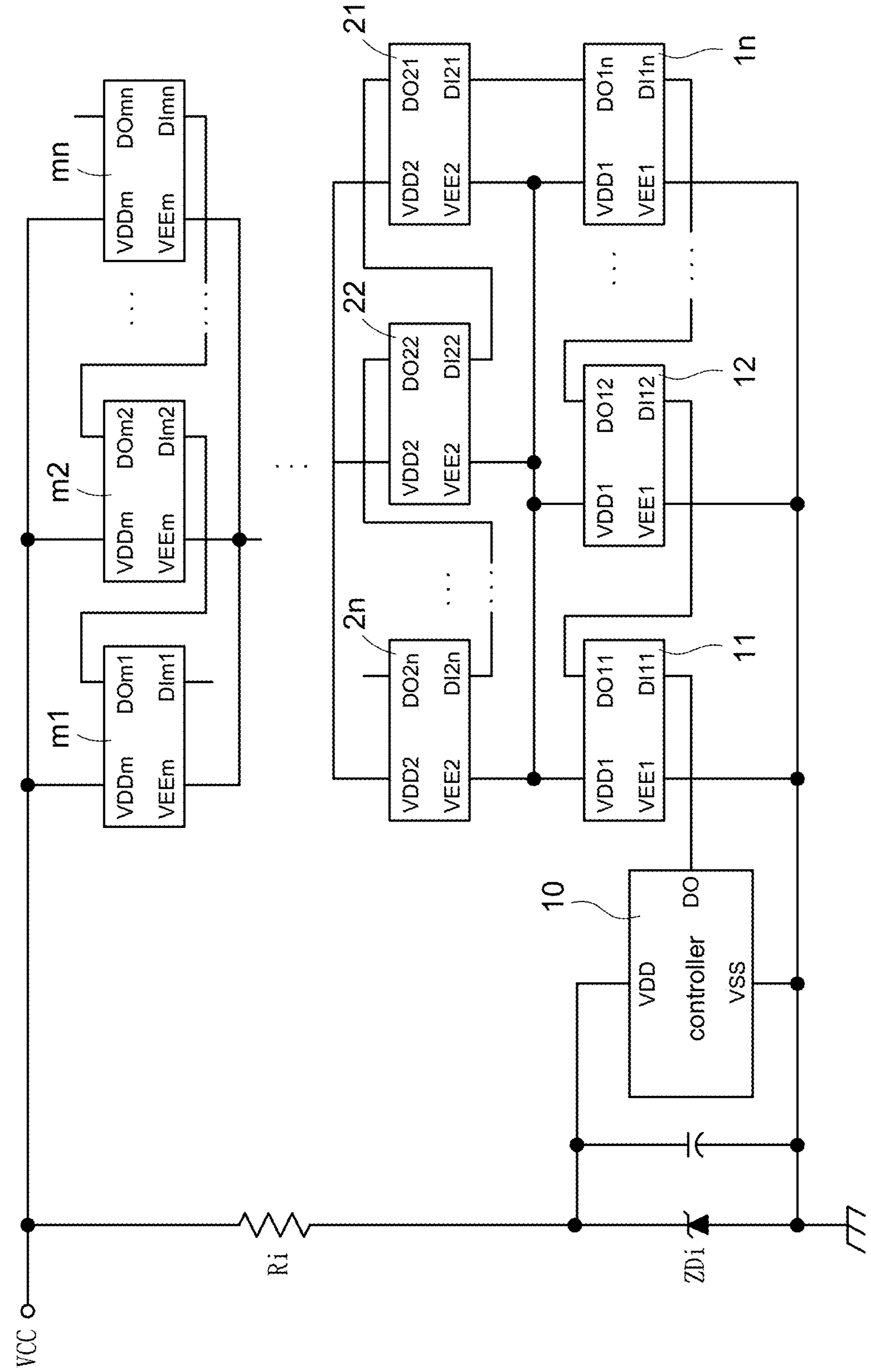
FIG. 2 is a block circuit diagram of the LED string with stable voltage control according to a second embodiment of the present disclosure.

Please refer to FIG. 2, which shows a block circuit diagram of the LED string with stable voltage control according to a second embodiment of the present disclosure. In the embodiment shown in FIG. 2, the LED apparatuses 11-*mn* form a parallel-series-connected structure, and the parallel-series-connected structure is a m-by-n (m×n) matrix structure. In such structure, negative voltage ends VEE1 of n LED apparatuses 11-1*n* in the first row are coupled to the negative polarity end VSS of the controller 10, positive voltage ends VDDm of n LED apparatuses m1-*mn* in the last row are coupled to the DC voltage VCC and receive the DC voltage VCC, and the remaining power pins (such as positive voltage ends VDD and negative voltage ends VEE) are connected in series by rows. Moreover, data signal pins (such as data input ends DI and data output ends DO) are connected in series.

Specifically, the sequence that the controller 10 provides the plurality of data signals is the first LED apparatus 11, the second LED apparatus 12, until the last LED apparatus mn. Moreover, the sequence that the controller 10 controls the power supply of the DC voltage VCC is n LED apparatuses m1-*mn* in the last row, n LED apparatuses (m−1)1−(m−1)n in the second to last row, until n LED apparatuses 11-1*n* in the first row. Therefore, in the embodiment shown in FIG. 2, the sequence of supplying power is opposite to the sequence of providing data signals.

Figure 3:
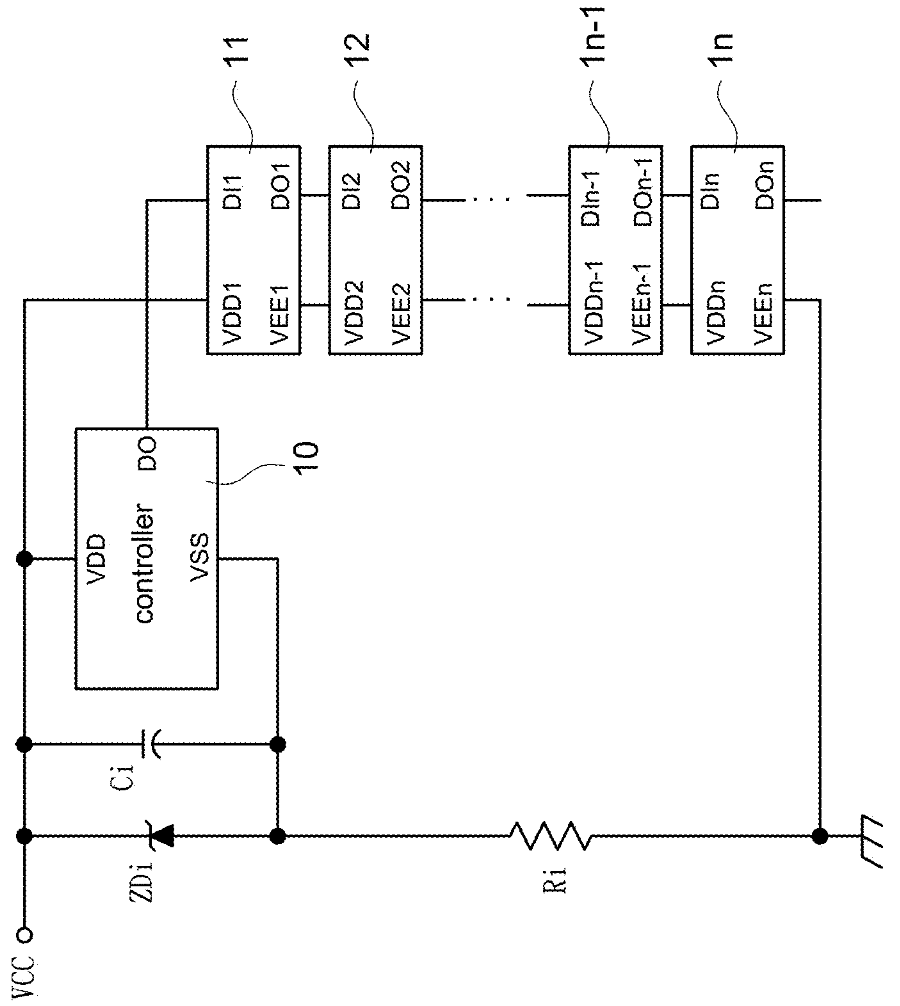
FIG. 3 is a block circuit diagram of the LED string with stable voltage control according to a third embodiment of the present disclosure.

Please refer to FIG. 3, which shows a block circuit diagram of the LED string with stable voltage control according to a third embodiment of the present disclosure. In the embodiment shown in FIG. 3, the LED apparatuses 11-1*n* form a series-connected structure. In such structure, a positive voltage end VDD1 of the first LED apparatus 11 is coupled to the DC voltage VCC and receives the DC voltage VCC, a negative voltage end VEEn of the last LED apparatus 1*n* is coupled to the negative polarity end VSS of the controller 10, and the remaining power pins (such as positive voltage ends VDD and negative voltage ends VEE) are connected in series. Moreover, data signal pins (such as data input ends DI and data output ends DO) are connected in series.

Specifically, the series-connected structure is a one-by-n (1×n) array structure, that is, the power pins are connected in series and the data signal pins are connected in series. The sequence that the controller 10 provides the plurality of data signals is the first LED apparatus 11, the second LED apparatus 12, until the last LED apparatus 1*n*. Moreover, the sequence that the controller 10 controls the power supply of the DC voltage VCC is the first LED apparatus 11, the second LED apparatus 12, until the last LED apparatus 1*n*. Therefore, in the embodiment shown in FIG. 2, the sequence of supplying power is the same as the sequence of providing data signals.

Figure 4:
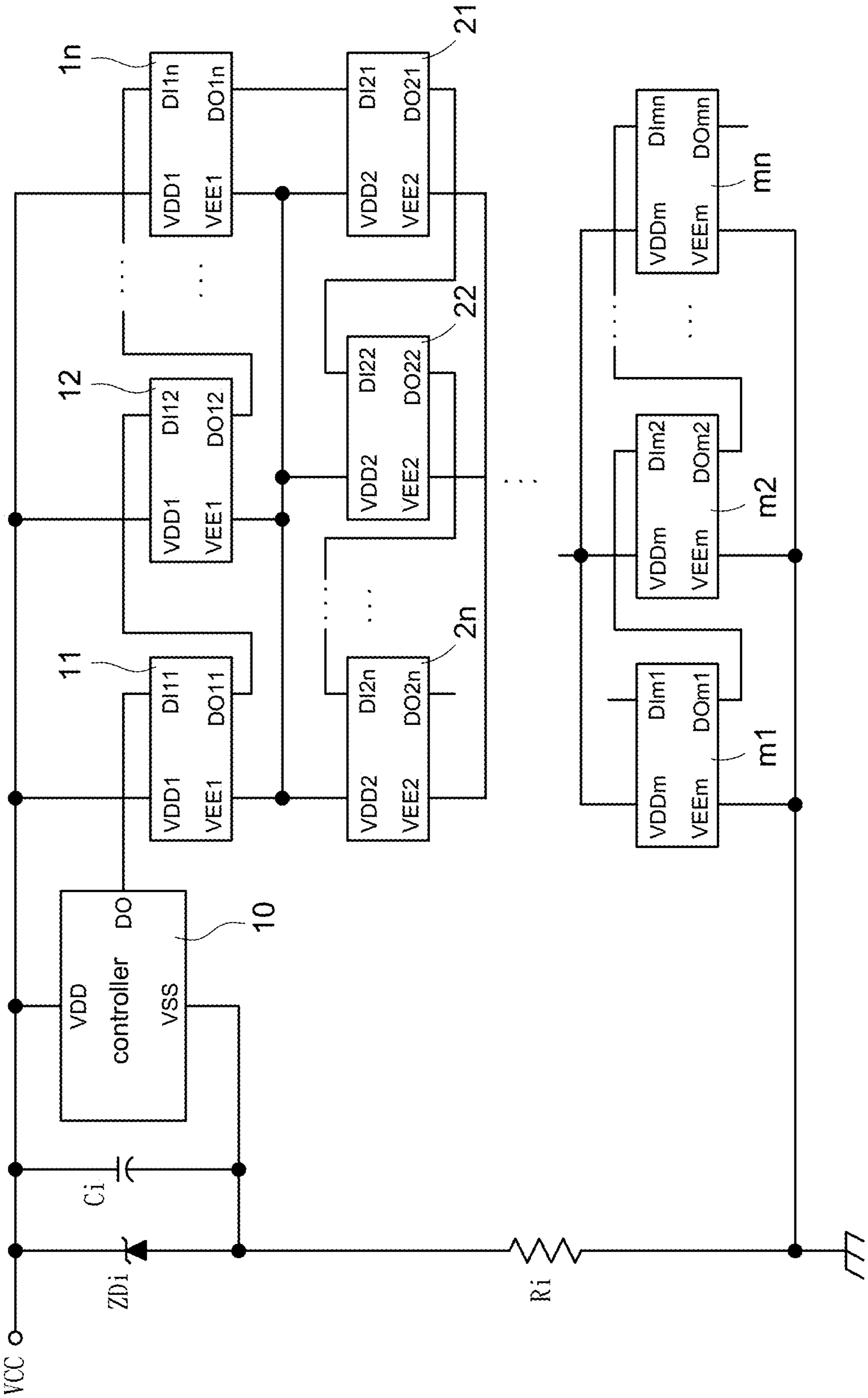
FIG. 4 is a block circuit diagram of the LED string with stable voltage control according to a fourth embodiment of the present disclosure.

Please refer to FIG. 4, which shows a block circuit diagram of the LED string with stable voltage control according to a fourth embodiment of the present disclosure. In the embodiment shown in FIG. 4, the LED apparatuses 11-*mn* form a parallel-series-connected structure, and the parallel-series-connected structure is a m-by-n (m×n) matrix structure. In such structure, positive voltage ends VDD1 of n LED apparatuses 11-1*n* in the first row are coupled to the DC voltage VCC and receives the DC voltage VCC, negative voltage ends VEEm of n LED apparatuses m1-*mn* in the last row are coupled to the negative polarity end VSS of the controller 10, and the remaining power pins (such as positive voltage ends VDD and negative voltage ends VEE) are connected in series by rows. Moreover, data signal pins (such as data input ends DI and data output ends DO) are connected in series.

Specifically, the sequence that the controller 10 provides the plurality of data signals is the first LED apparatus 11, the second LED apparatus 12, until the last LED apparatus mn. Moreover, the sequence that the controller 10 controls the power supply of the DC voltage VCC is n LED apparatuses 11-1*n* in the first row, n LED apparatuses 21-2*n* in the second row, until n LED apparatuses m1-*mn* in the last row. Therefore, in the embodiment shown in FIG. 4, the sequence of supplying power is the same as the sequence of providing data signals.

In addition to the different implementations of the power supply sequence and data signal sequence of the LED apparatuses disclosed above, each LED string has the ability to adjust the abnormally large current generated during the data signal transmission process so as to prevent unstable voltage distribution (unstable voltage control) caused by the extremely unstable working current due to large voltage fluctuations. Therefore, when no data signal is transmitted by the controller 10, the bypass path is enabled to bypass the signal path so that no current flowing through the signal path. Otherwise, when the controller 10 transmits the plurality of data signals, the bypass path is disabled to make the plurality of data signals be transmitted through the signal path.

Figure 5:
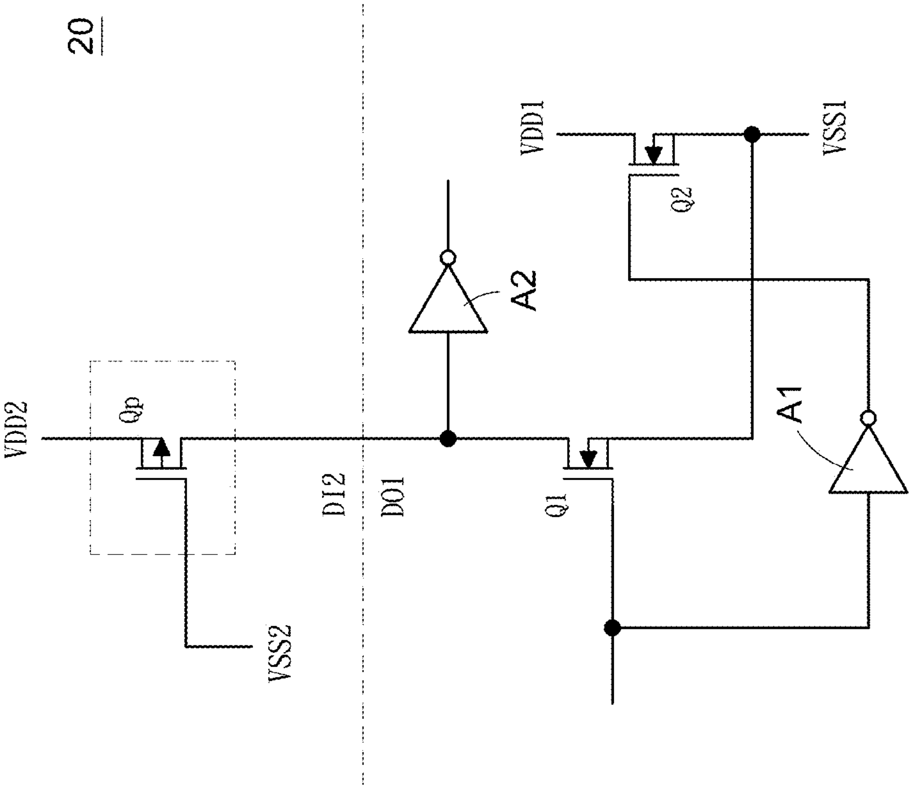
FIG. 5 is a block circuit diagram of a first bypass circuit according to the present disclosure.

Please refer to FIG. 5, which shows a block circuit diagram of a first bypass circuit according to the present disclosure. In particular, the first bypass circuit 20 is provided between any two LED apparatuses, and the first bypass circuit 20 is provided at a signal output terminal. As shown in FIG. 5, the first bypass circuit 20 includes a first switch Q1, a second switch Q2, and an inverting unit A1. The inverting unit A1 is connected between the first switch Q1 and the second switch Q2, and specifically is connected between two gate control ends of the two switches Q1, Q2. Therefore, the first switch Q1 and the second switch Q2 are complementarily turned on and turned off so as to implement enabling or disabling of the bypass path. The first switch Q1, the second switch Q2, and the inverting unit A1 are arranged at the data output end DO of the LED apparatus (for example, the data output end DO1 of the first LED apparatus), and the third switch Qp is arranged at the data input end DI of another LED apparatus adjacent to the LED apparatus. However, the first bypass circuit 20 shown in FIG. 5 is not intended to limit the present disclosure, and any circuit capable of realizing the same technical concept can be used as the first bypass circuit of the present disclosure.

Taking the first switch Q1 and the second switch Q2 of the first bypass circuit 20 shown in FIG. 5 being NMOSs as an example. Specifically, when the LED apparatus does not externally receive data signals, for example, but not limited to, provided by the controller 10, the first switch Q1 is turned off and the second switch Q2 is turned on (inversely controlled by the inverting unit A1) so that the bypass path provided by the second switch Q2 is enabled to bypass the signal path, thereby disconnecting the transmission path of the data signals.

Otherwise, when the LED apparatus externally receives the plurality of data signals, the first switch Q1 is turned on and the second switch Q2 is turned off (inversely controlled by the inverting unit A1) so that the bypass path is disabled, and therefore the plurality of data signals are transmitted through the signal path provided by the first switch Q1.

Under the existing operation without the first bypass circuit 20, when the controller 10 transmits the data signals, there will be larger voltage fluctuations at the signal output end (compared to when there is no data signal transmission), and therefore a large current will be generated on the signal path so that the ideal waveform (square wave) cannot be maintained for accurate identification. Conversely, when the controller 10 does not transmit the data signals, and since there is no such a large current, the working current is extremely unstable under the two operations of no data signal transmission and data signal transmission, and therefore it is extremely difficult to achieve stable voltage distribution (stable voltage control). Therefore, under the design of the first bypass circuit 20, by turning on the first switch Q1 (and turning off the second switch Q2) when the data signal is provided, the drain-source across voltage of the first switch Q1 is provided to compensate the voltage at the signal output end so as to stabilize the voltage at the signal output end (by clamping the voltage at the signal output end) so that it is possible to maintain a stable working current (whether in the operation of no data signal transmission or in the operation of data signal transmission), and realize the stable voltage control of the LED string.

Figure 6:
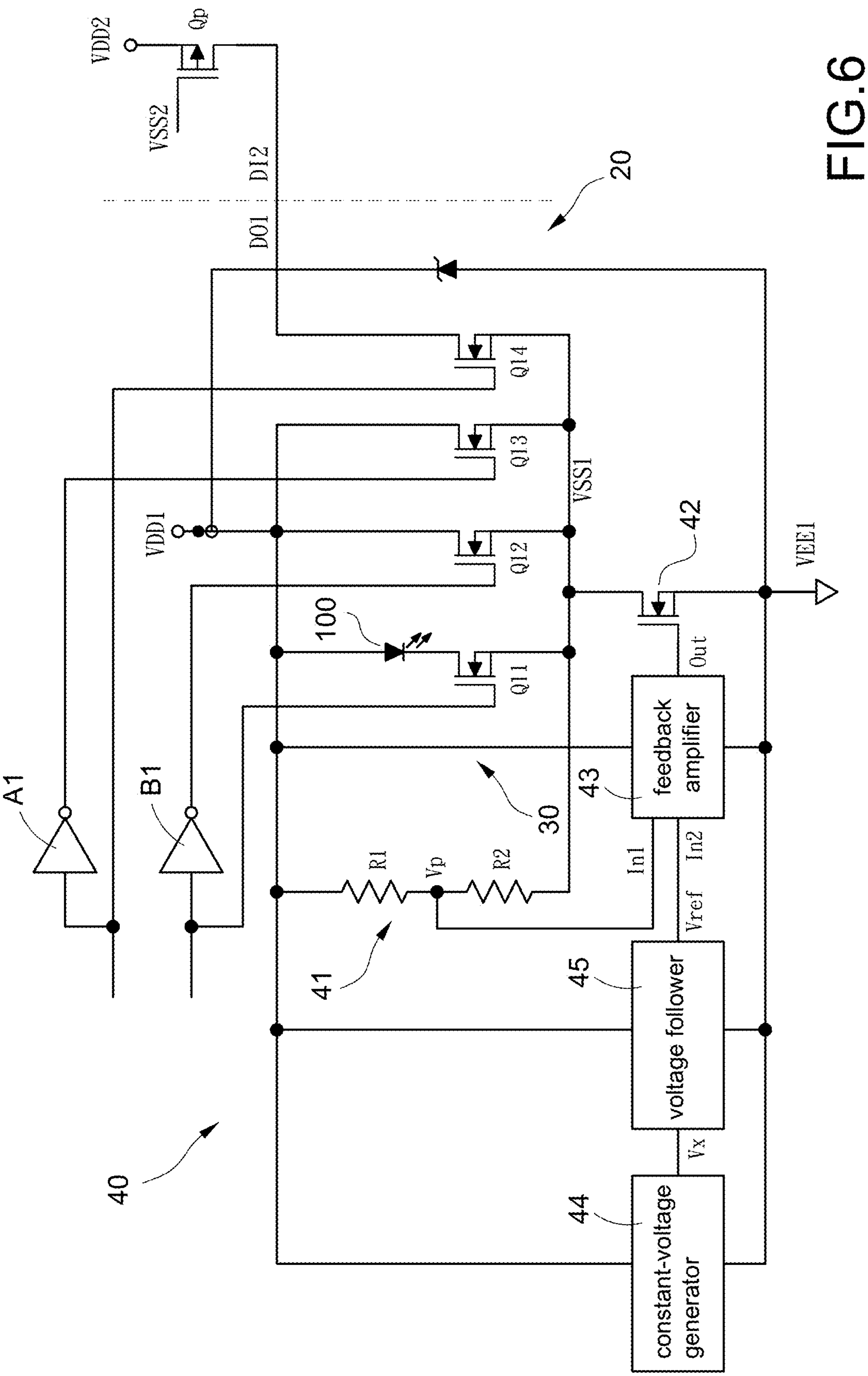
FIG. 6 is a block circuit diagram of a detailed structure of a LED apparatus according to a first embodiment of the present disclosure.

Please refer to FIG. 6, which shows a block circuit diagram of a detailed structure of a LED apparatus according to a first embodiment of the present disclosure. The LED apparatus includes at least one LED 100, a first bypass circuit 20, a second bypass circuit 30, and a voltage control circuit 40.

The number of LEDs 100 may be, for example but not limited to, one (single color), two (red plus green), three (three primary colors), four (three primary colors plus white), etc., which can be increased or decreased according to actual requirements, as one LED shown in FIG. 6. Each LED 100 includes an anode end and a cathode end, and the anode end receives a DC voltage for operating the LED. Incidentally, although the at least one LED 100 is shown in the LED apparatus, this is only for easier explanation of the operational relationship with other circuit components. In fact, the at least one LED 100 is coupled to the LED apparatus through an external connection.

The circuit structure of the first bypass circuit 20 may be referred to as shown in FIG. 5, and its operating principle and effect are the same. In this embodiment, the first bypass circuit 20 is arranged at the signal output end, i.e., is arranged at the data output end DO1 of the first LED apparatus.

The first bypass circuit 20 mainly includes a first switch Q14 (corresponding to the first switch Q1 shown in FIG. 5), a second switch Q13 (corresponding to the second switch Q2 shown in FIG. 5), and an inverting unit A1 (corresponding to the inverting unit A1 shown in FIG. 5). In the embodiment shown in FIG. 6, the first switch Q14, the second switch Q13, and the inverting unit A1 are arranged at the data output end DO1 of the LED apparatus. The first bypass circuit 20 is connected to the LED 100 and the second bypass circuit 30, and the first bypass circuit 20 is used to control the turning on and turning off of the first switch Q14 and the second switch Q13 in complementary by operating the inverting unit A1. When the controller 10 transmits the plurality of data signals, the first switch Q14 is turned on and the second switch Q2 is turned off (inversely controlled by the inverting unit A1) so that the bypass path is disabled, and therefore the plurality of data signals are transmitted through the signal path provided by the first switch Q14. The drain-source across voltage of the first switch Q14 is provided to compensate the voltage at the signal output end so as to stabilize the voltage at the signal output end (by clamping the voltage at the signal output end), and therefore it is possible to maintain a stable working current (whether in the operation of no data signal transmission or in the operation of data signal transmission), and realize the stable voltage control of the LED string.

The second bypass circuit 30 includes an inverting unit B1 and a bypass switch assembly Q11, Q12. Compared with the stable voltage compensation for data signal transmission operation implemented by the first bypass circuit 20, the second bypass circuit 30 is used to perform the stable voltage compensation for the light-emitting operation of the LED apparatus. The inverting unit B1 may be, for example, but not limited to, a not gate. The second bypass circuit 30 is coupled between the positive polarity end VDD and the negative polarity end VSS, and the bypass switch Q12 has a first equivalent impedance when it is turned on. When the switch Q11 is turned on, the LED 100 and the switch Q11 have a second equivalent impedance, and the second equivalent impedance may be regarded as an internal resistance of the LED 100 plus an internal resistance (i.e., Rds_on) of the switch Q11 when the switch Q11 is turned on. When the switch Q11 is turned off, the bypass switch Q12 of the second bypass circuit 30 provides the first equivalent impedance equivalent to the second equivalent impedance to maintain the cross voltage at a constant voltage. Specifically, when the switch Q11 is turned off, the bypass switch Q12 of the second bypass circuit 30 is used to replace the equivalent impedance while the switch Q11 is turned on so as to maintain/stabilize the cross voltage Vc between the positive polarity end VDD and the negative polarity end VSS at a constant voltage whether the switch Q11 is turned on or turned off.

The turning-on or turning-off of the bypass switch Q12 is controlled by the inverting unit B1 inversely to the switch Q11 so that the first equivalent impedance equivalent to the second equivalent impedance is provided when the bypass switch Q12 is turned on. On the other hand, the number of sets of the inverting unit B1 and the bypass switch Q12 may correspond to the number of the LEDs 100 so that each LED 100 has a set of replaceable equivalent impedances. But it does not exclude that the entire set of LED apparatus only includes a single set of second bypass circuits 30 so that the equivalent impedance of all LEDs 100 inside the entire LED apparatus is reduced by a single set of second bypass circuits 30.

In particular, since the first equivalent impedance (i.e., Rds_on) while the bypass switch Q12 is turned on is equal to the internal resistance of the LED 100 plus the internal resistance (i.e., Rds_on) of the switch Q11 when the switch Q11 is turned on, the internal resistance (i.e., Rds_on) of the bypass switch Q12 must be higher than the internal resistance (i.e., Rds_on) of the switch Q11.

The voltage control circuit 40 is coupled to the positive polarity end VDD and the negative polarity end VSS, and is used to maintain/stabilize the cross voltage Vc between the positive polarity end VDD and the negative polarity end VSS at a constant voltage. Moreover, the switch Q11 may be coupled between the cathode end and the negative polarity end VSS, or between the anode end and the positive polarity end VDD, for example but not limited thereto.

Specifically, when the switch Q11 is turned on, the positive polarity end VDD, the anode end, the cathode end, the switch Q11 to the negative polarity end VSS form a closed loop, and generate a first current flowing from the anode end to the cathode end of the LED 100. Since the DC voltages of conventional LED apparatuses are different, the first current flowing from the anode end to the cathode end is also different, which is the main reason for the inconsistent brightness of the LED 100.

In order to make the brightness of the LEDs 100 of each LED apparatus consistent, it is necessary to control the first current to be consistent. Therefore, the present disclosure uses the voltage control circuit 40 to control the cross voltage Vc between the positive polarity end VDD and the negative polarity end VSS to be a constant voltage to acquire a constant current. Specifically, since the cross voltage of each LED apparatus is fixed at a constant voltage (such as but not limited to 3V), a first current flowing from the anode end of the LED 100 to the cathode end thereof can be fixed at a constant current. Therefore, the first current flowing through the LED 100 can be fixed as a constant current so that the brightness of the LED 100 is constant with the constant current, and then the brightness of the LEDs 100 of each LED apparatus can be controlled to be consistent. Therefore, as long as the voltage control circuit 40 (such as but not limited to, a circuit, a programmable controller including software control, an analog controller composed of hardware, or microcontrollers) can adjust the cross voltage of each LED apparatus to a constant voltage, it should be included in the scope of the present disclosure.

The voltage control circuit 40 includes a voltage-dividing circuit 41, a transistor 42, and a feedback amplifier 43. The voltage-dividing circuit 41 is coupled between the positive polarity end VDD and the negative polarity end VSS to divide the DC voltage VDD to generate a divided voltage Vp. The voltage-dividing circuit 41 is, for example but not limited to, composed of resistors R1, R2 so that the DC voltage VDD is divided to generate the divided voltage Vp between the two resistors R1, R2. The transistor 42 is coupled between the voltage-dividing circuit 41 and the ground end VEE, and is used to turn on or turn off a path from the voltage-dividing circuit 41 to the ground end VEE. The feedback amplifier 43 includes a first input end In1, a second input end In2, and an output end Out. The first input end In1 is coupled to the voltage-dividing circuit 41 to receive the divided voltage Vp provided by the voltage-dividing circuit 41. The second input voltage In2 receives a reference voltage Vref and the output end Out is coupled to a control end of the transistor 42.

Furthermore, the transistor 42 is controlled substantially in the linear region. The feedback amplifier 43 provides a second control signal to the control end of the transistor 42 according to the divided voltage Vp and the reference voltage Vref to fix the channel size of the transistor 42. Therefore, the voltage control circuit 40 can adjust the potential of the negative polarity end VSS by adjusting the channel size of the transistor 42 so that the potential of the negative polarity end VSS is adjusted to maintain the cross voltage at a constant voltage to acquire a constant current. Specifically, since the second control signal controls the gate-source voltage Vgs of the transistor 42 to be constant, the drain-source voltage Vds of the transistor 42 is affected by the drain current Id flowing through the transistor 42 so that the potential of the negative polarity end VSS is adjusted. Therefore, by adjusting the potential of the negative polarity end VSS, the cross voltage Vc between the positive polarity end VDD and the negative polarity end VSS can be maintained at a fixed voltage (such as but not limited to 3V).

As shown in FIG. 6, the voltage control circuit 40 further includes a constant-voltage generator 44 (for example, but not limited to, a constant voltage source) and a voltage follower 45. The constant-voltage generator 44 is used to generate a constant voltage Vx, and the voltage follower 45 electrically isolates and amplifies the constant voltage Vx to generate the reference voltage Vref corresponding to the constant voltage Vx. Specifically, since the reference voltage Vref should be a stable and constant value, it may not be easy to maintain its stability (such as but not limited to factors such as noise interference, loop current changes, etc.) directly supplied by the constant-voltage generator 44 alone so that a slight change in the reference voltage Vref changes the drain current Id of the transistor 42, resulting in the situation that the cross voltage cannot be maintained at a fixed voltage. Therefore, the constant voltage Vx can be electrically isolated and amplified into the reference voltage Vref through the electrical isolation and amplification characteristics of the voltage follower 45 to avoid interference from noise and maintain the stability of the reference voltage Vref. In particular, the constant-voltage generator 44 and the voltage follower 45 can be integrated inside the controller 10, or can be independently configured outside the controller 10, and can also be implemented by devices such as circuits or controllers.

On the other hand, the voltage control circuit 40 and the second bypass circuit 30 shown in FIG. 6 are only the most cost-effective implementations among many implementations, and they are only composed of relatively cheap circuit components. However, the voltage control circuit 40 and the second bypass circuit 30 are not limited to be implemented only by the embodiment shown in FIG. 6, that is, all circuits, controllers, and other devices that can achieve the above features and effects should be included in the scope of the present disclosure.

Figure 7:
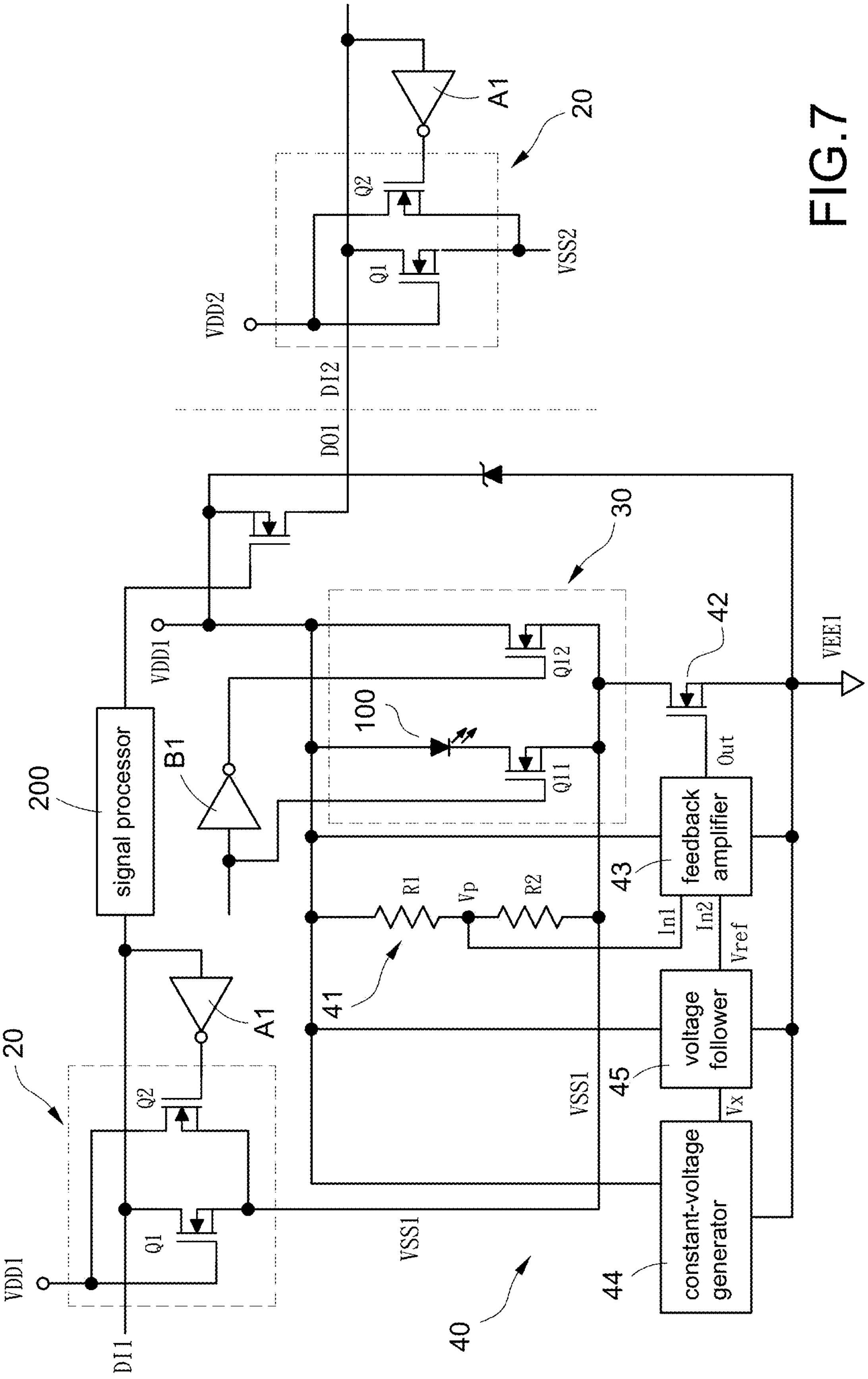
FIG. 7 is a block circuit diagram of a detailed structure of the LED apparatus according to a second embodiment of the present disclosure.

Please refer to FIG. 7, which shows a block circuit diagram of a detailed structure of the LED apparatus according to a second embodiment of the present disclosure. The major difference between this embodiment and the first embodiment shown in FIG. 6 is that the first bypass circuit 20 is arranged at the signal input end, i.e., at the data input end DI1 of the first LED apparatus. Therefore, the first bypass circuit 20 is arranged at the front end of a signal processor 200 so that the before the signal enters the signal processor 200, the stable voltage compensation is implemented by clamping the voltage at the data input end. Afterward, the control signal generated by the signal processor 200 is used to control the back-end switch. In the embodiment, the feedback control of the first bypass circuit 20 is further added to the process of constant voltage control. Therefore, the first switch Q1 and the second switch Q2 of the first bypass circuit 20 shown in FIG. 7 are connected to the constant-voltage generator 44, and further the voltage follower 45 is electrically isolated and amplified to generate the reference voltage Vref corresponding to the constant voltage Vx so as to avoid interference from noise and maintain the stability of the reference voltage Vref.

Figure 8:
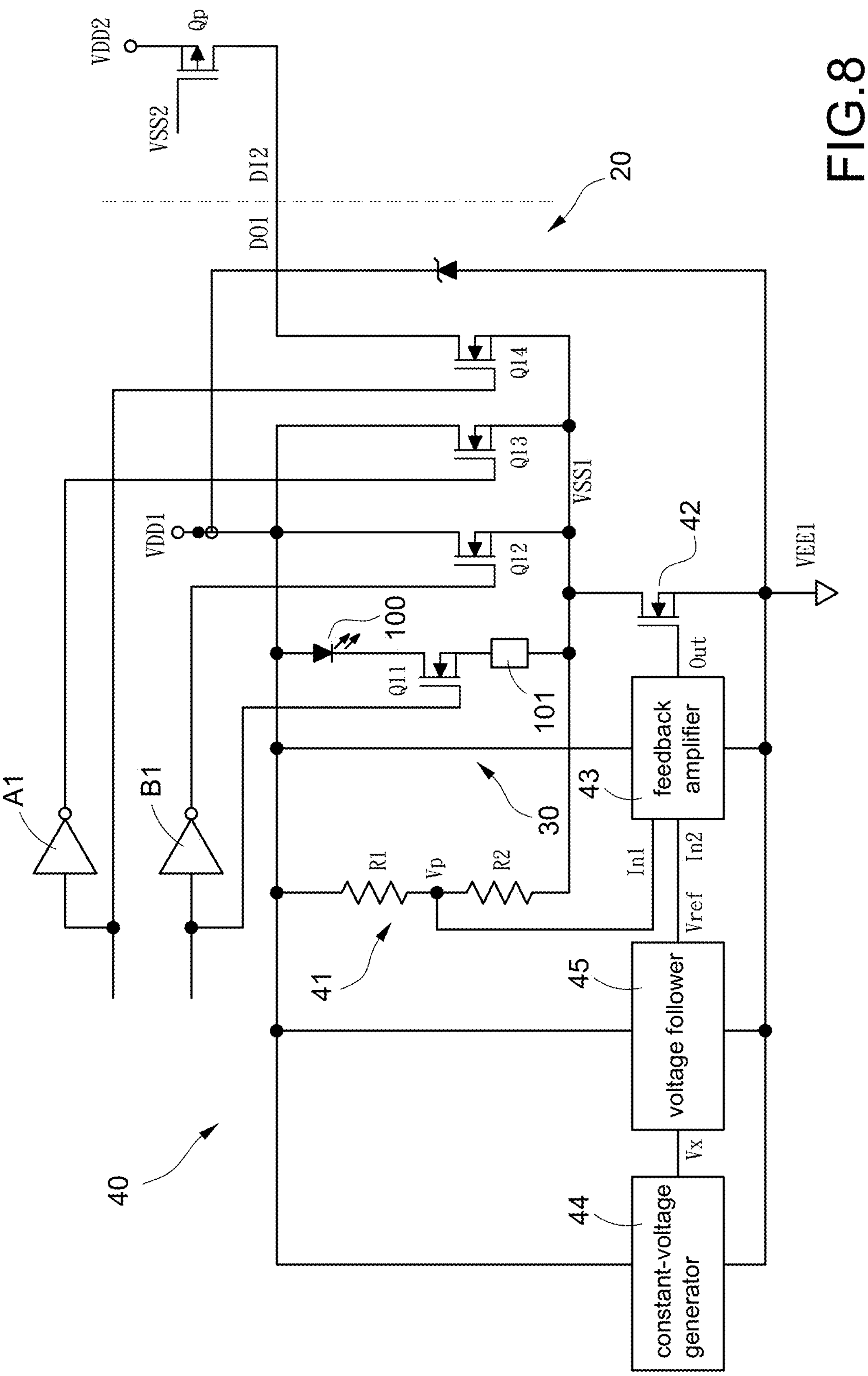
FIG. 8 is a block circuit diagram of a detailed structure of the LED apparatus according to a third embodiment of the present disclosure.
Figure 9:
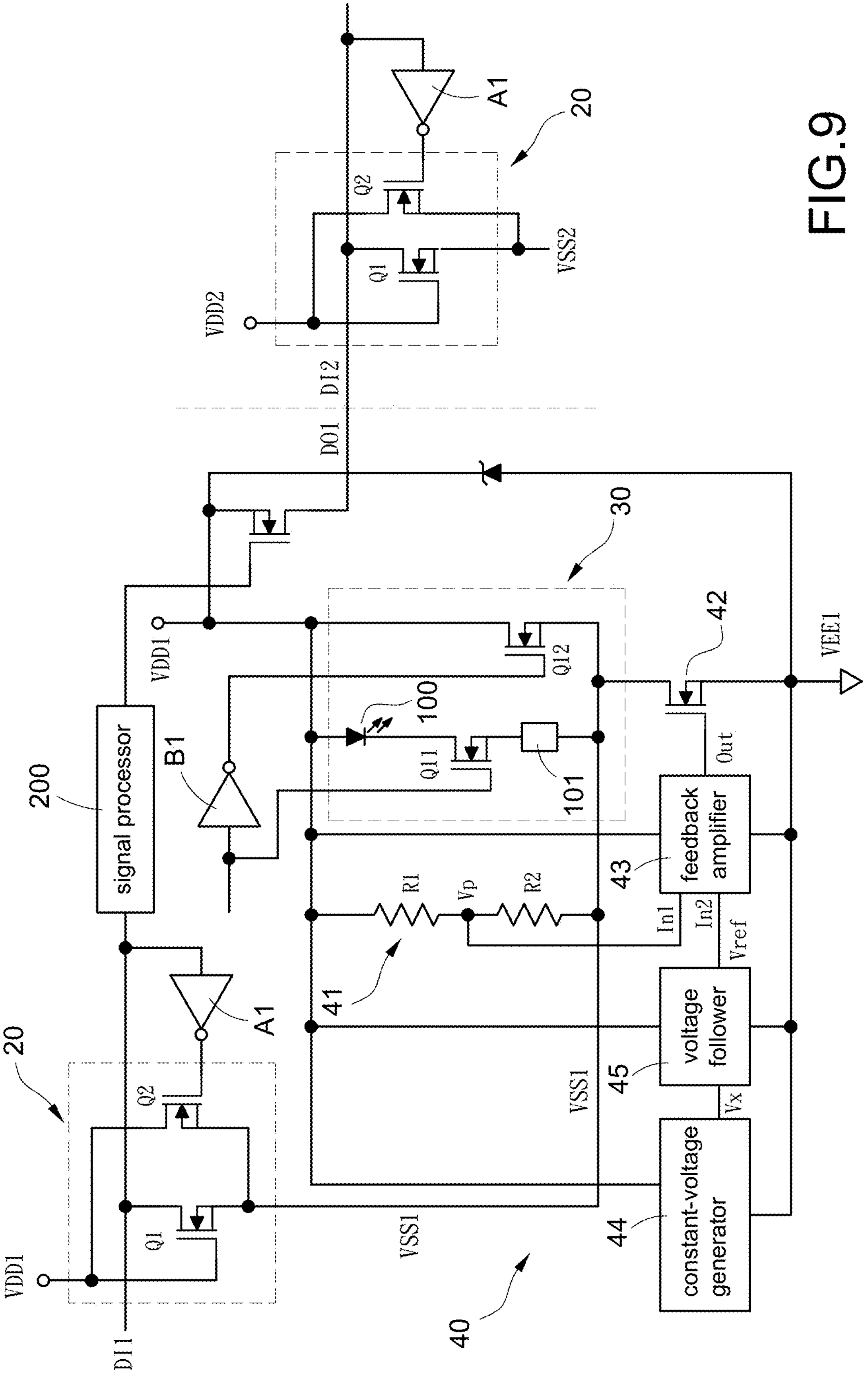
FIG. 9 is a block circuit diagram of a detailed structure of the LED apparatus according to a fourth embodiment of the present disclosure.

Please refer to FIG. 8 and FIG. 9, which respectively show block circuit diagrams of a detailed structure of the LED apparatus according to a third embodiment and a fourth embodiment of the present disclosure. In particular, FIG. 8 is corresponding to FIG. 6, and the major difference between FIG. 6 and FIG. 8 is that the second bypass circuit 30 of the latter further includes an impedance matching component 101. Also, FIG. 9 is corresponding to FIG. 7, and the major difference between FIG. 7 and FIG. 9 is that the second bypass circuit 30 of the latter further includes an impedance matching component 101.

As mentioned above, the second bypass circuit 30 shown in FIG. 8 includes the inverting unit B1, the bypass switch assembly Q11, Q12, and the impedance matching component 101. In particular, the impedance matching component 101 is connected to the LED 100 and the switch Q11 in series. In the second bypass circuit 30 shown in FIG. 6, if only the switch Q11 is used, the LED 100 and the switch Q11 have the second equivalent impedance. Although the impedance matching between the second equivalent impedance and the first equivalent impedance of the bypass switch Q12 can achieve a considerable effect, the impedance matching effect can be better if the impedance matching component 101 is added. In particular, the characteristics of the impedance matching component 101 can be equivalent to the electrical characteristics of the LED 100, and therefore it is not limited to the use of a single component or the use of circuits as long as this technical characteristic can be realized. Therefore, by designing the impedance characteristics of the impedance matching component 101 (not a linear characteristic of a single resistance value) to correspond to the impedance characteristic of the LED 100, the impedance matching effect can be better.

Similarly, as shown in FIG. 9, the second bypass circuit 30 also includes the inverting unit B1, the bypass switch assembly Q11, Q12, and the impedance matching component 101. The principle and means of its operation are the same as those in FIG. 8, so they will not be described in detail here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode (LED) string with stable voltage control, configured to receive a DC voltage, the LED string comprising:

a plurality of LED apparatuses, each LED apparatus comprising a positive voltage end, a negative volage end, a data input end, and a data output end, wherein each LED apparatus is coupled to a LED, and a controller, comprising a positive polarity end, a negative polarity end, and a data end, wherein the positive polarity end is coupled to the DC voltage and the negative polarity end is coupled to a ground end, wherein the plurality of LED apparatuses sequentially receives a plurality of data signals externally provided by the controller through a signal path, and the controller is configured to first supply power to the LED apparatus that directly receives the DC voltage via the positive voltage end, and the remaining LED apparatuses are supplied power sequentially so that the plurality of LED apparatuses are sequentially driven by a drive voltage, wherein when the plurality of LED apparatuses does not receive the plurality of data signals, a bypass path is enabled to bypass the signal path so that no current flowing through the signal path to perform a constant-voltage compensation for the light-emitting operation of the LED apparatus; when the plurality of LED apparatuses receives the plurality of data signals, the bypass path is disabled to make the plurality of data signals be transmitted through the signal path so that the plurality of LED apparatuses is stably supplied power under the constant-voltage compensation by the drive voltage.

2. The LED string as claimed in claim 1, wherein the plurality of LED apparatuses forms a series-connected structure or a parallel-series-connected structure; the negative voltage end of the first LED apparatus is coupled to the negative polarity end of the controller, and the positive voltage end of the last LED apparatus is coupled to the DC voltage.

3. The LED string as claimed in claim 2, wherein the series-connected structure is a one-by-n array structure, wherein the sequence that the controller provides the plurality of data signals is the first LED apparatus, the second LED apparatus, until the last LED apparatus, wherein the sequence that the controller controls the power supply of the DC voltage is the last LED apparatus, the second to last LED apparatus, until the first LED apparatus.

4. The LED string as claimed in claim 2, wherein the parallel-series-connected structure is a m-by-n matrix structure, wherein the sequence that the controller provides the plurality of data signals is the first LED apparatus, the second LED apparatus, until the last LED apparatus, wherein the sequence that the controller controls the power supply of the DC voltage is n LED apparatuses in the last row, n LED apparatuses in the second to last row, until the n LED apparatuses in the first row.

5. The LED string as claimed in claim 1, wherein the plurality of LED apparatuses forms a series-connected structure or a parallel-series-connected structure; the positive voltage end of the first LED apparatus is coupled to the DC voltage, and the negative voltage end of the last LED apparatus is coupled to the negative polarity end.

6. The LED string as claimed in claim 5, wherein the series-connected structure is a one-by-n array structure, wherein the sequence that the controller provides the plurality of data signals is the first LED apparatus, the second LED apparatus, until the last LED apparatus, wherein the sequence that the controller controls the power supply of the DC voltage is the first LED apparatus, the second LED apparatus, until the last LED apparatus.

7. The LED string as claimed in claim 5, wherein the parallel-series-connected structure is a m-by-n matrix structure, wherein the sequence that the controller provides the plurality of data signals is the first LED apparatus, the second LED apparatus, until the last LED apparatus, wherein the sequence that the controller controls the power supply of the DC voltage is n LED apparatuses in the first row, n LED apparatuses in the second row, until the n LED apparatuses in the last row.

8. The LED string as claimed in claim 1, wherein each LED apparatus further comprises:

a first bypass circuit, comprising:

a first switch and a second switch, coupled to the drive voltage, and the second switch configured to provide the bypass path, and an inverting unit, coupled to the first switch and the second switch, wherein the first switch and the second switch are turned on and turned off in complementary by operating the inverting unit.

9. The LED string as claimed in claim 8, wherein the first bypass circuit is arranged at the data output end of each of the LED apparatuses.

10. The LED string as claimed in claim 8, wherein the first bypass circuit is arranged at the data input end of each of the LED apparatuses.

11. The LED string as claimed in claim 8, wherein when the plurality of LED apparatuses do not receive the plurality of data signals, the first switch is turned off and the second switch is turned on so that the bypass path is enabled; when the plurality of LED apparatuses receive the plurality of data signals, the first switch is turned on and the second switch is turned off so that the plurality of data signals is transmitted through the signal path provided by the first switch.

12. The LED string as claimed in claim 1, wherein each LED apparatus further comprises:

a second bypass circuit, comprising:

a first switch and a second switch, coupled to the drive voltage, wherein the first switch is coupled to the LED in series, and an inverting unit, coupled to the first switch and the second switch, wherein the first switch and the second switch are turned on and turned off in complementary by operating the inverting unit.

13. The LED apparatus as claimed in claim 12, wherein the second bypass circuit further comprises:

an impedance matching component, coupled to the first switch and the LED in series, wherein the impedance matching component is configured to provide an impedance characteristic corresponding to the LED.

* * * * *